United States Patent
Komeno (10) Patent No.: US 6,351,599 B1
(45) Date of Patent: *Feb. 26, 2002

(54) PICTURE IMAGE SELECTING AND DISPLAY DEVICE

(75) Inventor: Junichi Komeno, Osaka (JP)

(73) Assignee: Matsushita Electric Industrial, Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,991
(22) PCT Filed: Feb. 28, 1997
(86) PCT No.: PCT/JP97/00595
  § 371 Date: Feb. 2, 1998
  § 102(e) Date: Feb. 2, 1998
(87) PCT Pub. No.: WO97/33433
  PCT Pub. Date: Sep. 12, 1997

(30) Foreign Application Priority Data

Mar. 4, 1996 (JP) .............................. 8-046444

(51) Int. Cl.⁷ .............................................. H04N 5/781
(52) U.S. Cl. ............................ 386/70; 386/83; 345/721
(58) Field of Search ................................ 386/1, 46, 83, 386/69–70; 345/327–328, 719–723; 348/906, 563, 564, 569; 725/39–56

(56) References Cited

U.S. PATENT DOCUMENTS

| 5,479,266 A | 12/1995 | Young et al. | |
| 5,479,268 A | 12/1995 | Young et al. | |
| 5,488,409 A | * 1/1996 | Yuen et al. | 386/83 |
| 5,608,542 A | * 3/1997 | Krahe et al. | 358/449 |
| 5,630,119 A | * 5/1997 | Aristides et al. | 395/601 |
| 5,686,954 A | * 11/1997 | Yoshinobu et al. | 348/906 |
| 5,793,438 A | * 8/1998 | Bedard | 348/569 |
| 5,812,123 A | * 9/1998 | Rowe et al. | 345/327 |
| 5,907,323 A | * 5/1999 | Lawler et al. | 345/327 |

FOREIGN PATENT DOCUMENTS

| JP | 2-202766 | 8/1990 |
| JP | 6-22273 | 1/1994 |
| JP | 6-504165 | 5/1994 |
| JP | 7-184173 | 7/1995 |

OTHER PUBLICATIONS

Japanese language search report for Int'l Appln. No. PCT/JP97/00595.
English translation of Japanese language search report.
Derwent search.

* cited by examiner

Primary Examiner—Thai Tran
(74) Attorney, Agent, or Firm—Ratner & Prestia, PC (57) ABSTRACT

When a user selects a program from a list or chart, the program is treated as a determined program desired by the user. Therefore, an inconvenience such as a duplicate operation or the like has been generated. Thus, a display device having first and second display areas, a menu display part for displaying a menu including a plurality of button keys corresponding to a plurality of television programs stored in a picture image storage device 14 on the first display area, a selection receiving part for receiving a selection by an operator relative to the plurality of button keys on the menu displayed on the first display area and a selected picture image display part for displaying picture or video images corresponding to the selection which are fed successively in a sequence of frames on the second display area based on a selecting code received by the selection receiving part, so that a desired television program can be selected from a plurality of television programs stored in the picture image storage device without unnecessary repeated operations.

2 Claims, 4 Drawing Sheets

PICTURE IMAGE SELECTING AND DISPLAY DEVICE

This application is the U.S. national-phase application of PCT International Application No. PCT/JP97/00595.

TECHNICAL FIELD

The present invention relates to a picture image selecting and display device designed to select and display a desired picture image from a plurality of picture images.

BACKGROUND ART

In recent years, a technique for compressing picture images and a recording device (for example, a hard disk with a large capacity using a magnetic disk as a recording medium or a DVD using an optical disk as a recording medium) capable of recording data with a large capacity such as an animated picture image have been developed. Thus, it has been possible to record many broadcasting programs composed of picture images by utilizing them.

On the other hand, the number of programs themselves whose picture images have been recorded has been rapidly increased with the repletion of the programs by a community antenna television in addition to the broadcasting programs by a ground wave broadcasting and a satellite broadcasting.

Under these circumstances, if many programs were recorded in the above described recording device having the large capacity, there would arise a problem that it would take remarkably much time to search a program which is desired to be seen afterward owing to the large number of programs recorded on the recording device.

Thus, in order to solve such a problem in the conventional technique, there have been proposed devices disclosed in Patent Application Laid-open No. 6-22273 or the like.

A broadcast receiving, recording and reproducing device disclosed in the Patent Application Laid-open No. 6-22273 is a device designed to display the list of recorded program information and select the program information from the list so that the program information is immediately reproduced.

However, according to the above mentioned conventional device, when a user selects a program from the list or chart, the program is treated as a defined program desired by the user. Therefore, there have occurred various kinds of inconveniences as mentioned below.

Since the program is composed of picture images, the contents of the program can be expressed only to a limited extent on the basis of a text. Thus, a user cannot sometimes understand what is the program only by showing the list.

Further, when the user sees the program selected and displayed from the list and he or she does not like it, the user needs to display again the list and select another program. In other words, the user needs to repeatedly carry out operations for returning to the list from the picture or video images of the program selected and displayed from the list until the user can find a desired program.

Still further, when the number of programs whose picture or video images are recorded is large and the list covers a plurality of pages, skipping operations to the aimed page of the list must be repeatedly carried out until the desired program is found. As a countermeasure for meeting the above described operations, a method for deleting the program information which has been already selected from the list or chart may be employed. However, in this case, when it is desired to see the program which has been already selected and whose program information has been deleted, there has arisen an inconvenience and another problem has been encountered.

DISCLOSURE OF INVENTION

With the above mentioned problems taken into consideration, an object of the present invention is to provide a picture image selecting and display device with a simple structure which can be realized at a low cost and can select a desired picture image from a plurality of picture images stored in a picture image storing means or transmitted by a simple operation without unnecessary repeated operations.

To solve the above mentioned problems, the present invention is a picture image selecting and display device comprising a display member having a first display area and a second display area, a menu display member for displaying a menu including a plurality of selecting branches corresponding to a plurality of picture images which are stored in a picture image storing member or transmitted on the first display area, a selection receiving member for receiving a selection by an operator relative to a plurality of selecting branches included in the menu displayed on the first display area, and a selected picture image display member for displaying a picture or video image concerning a picture image corresponding to the selection on the second display area based on the selection received by the selection receiving member.

Further, each of the plurality of picture images may be an animated picture image or a stationary picture image.

Further, a picture or video image of the animated picture image corresponding to above-mentioned selection may be the animated picture image itself, the picture or video image of the animated picture image fed successively in a sequence of frames, a prescribed picture or video image of the animated picture image or a top picture or video image of the animated picture image.

Further, each of the plurality of picture images stored in the above-mentioned picture image storing member may be a television program composed of picture or video images which are recorded; and said plurality of selecting branches are determined based on at least one of the date and hour, the genre and the channel of the television program whose picture images are recorded.

Further, a picture image selecting and display device may comprise an instruction receiving member for receiving an instruction by said operator to display a picture image corresponding to a picture or video image displayed on the second display area on said first and second display areas and a display determining member for displaying a picture image corresponding to the picture or video image displayed on the second display area on said first and second display areas when said instruction receiving member receives the instruction by said operator.

Further, the menu and the picture or video image concerning the picture image corresponding to said selection may be stored in said picture image storing member.

Further, an enlarging and display member for enlarging and displaying information in the selecting branch selected by an operator in a prescribed area of the first display area may be provided.

Further, the information in the selecting branch may be characters displayed in the selecting branch and/or information concerning the contents of a picture image corresponding to the previously stored selecting branch.

Further, the present invention is a picture image selecting and display device comprising a display member having display areas, a menu display member for displaying a menu stored in a picture image storing member and including a plurality of selecting branches corresponding to a plurality of picture images which are transmitted, and an enlarging and display member for enlarging and displaying information included in the menu displayed on said display areas in a prescribed area in the display areas.

DESCRIPTION OF SYMBOLS

11 . . . Display device
12 . . . Picture image plane
12-*a* . . . First display area
12-*b* . . . Second display area
13 . . . Picture image display control circuit
14 . . . Picture image storage device
15 . . . Remote controller
16 . . . Infrared ray receiving part
17 . . . Instruction receiving part
18 . . . Menu display part
19 . . . Menu generating part
20 . . . Selection receiving part
21 . . . Selected picture image display part
22 . . . Picture image expanding part
23 . . . Display determining part
24 . . . Cursor
25 . . . Button key

BEST MODE FOR CARRYING OUT THE INVENTION

Now, an explanation will be given to the embodiments of the present invention hereinafter by referring to the drawings.

Figure 1:
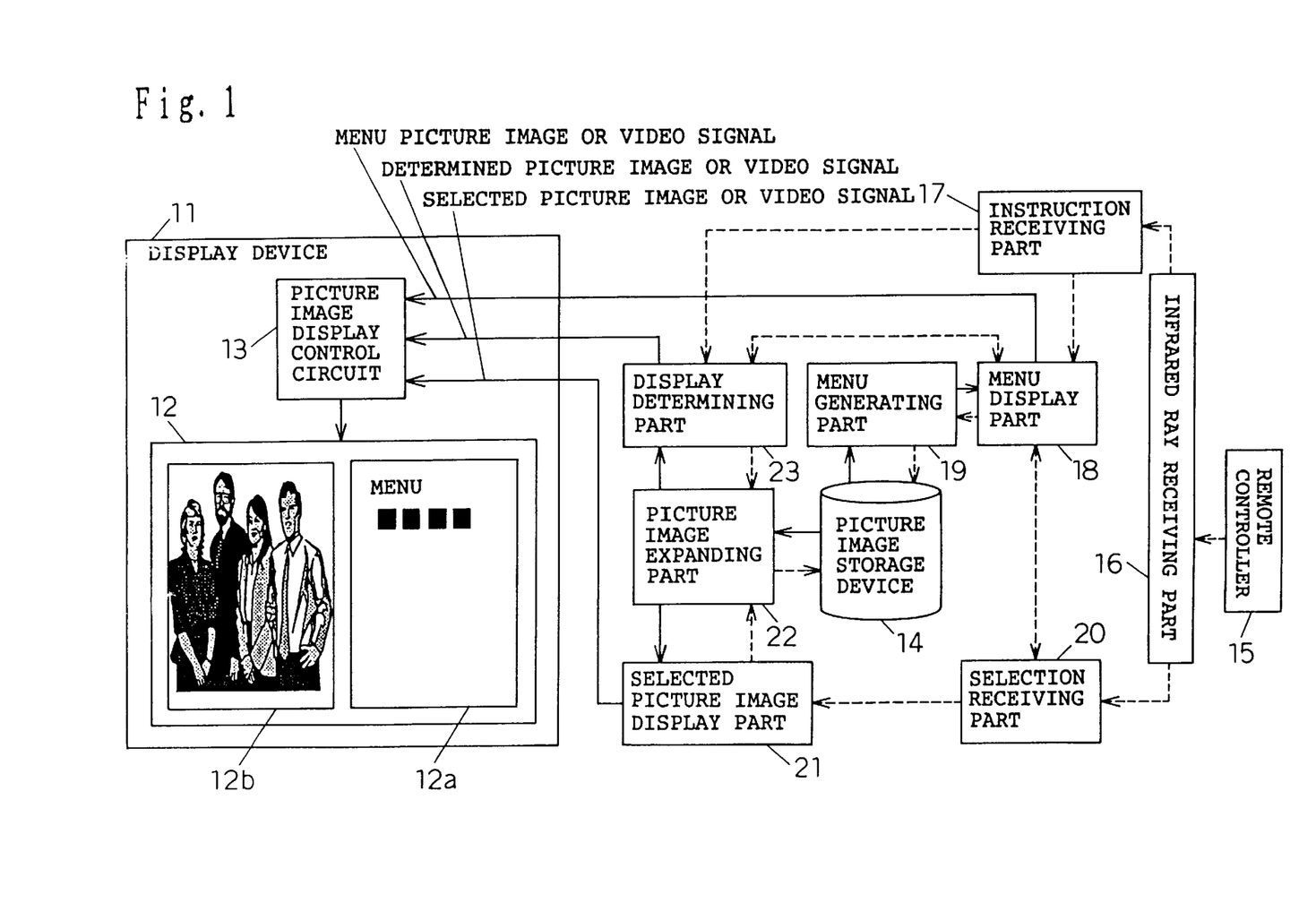
FIG. 1 is a block diagram of an embodiment of a picture image selecting and display device according to the present invention.

There will be explained an embodiment of a picture image selecting and display device according to the present invention with reference to FIG. 1 illustrating its block diagram. Specifically, a display device 11 is a television having a picture image plane 12 and a picture image display control circuit 13 in which picture images can be respectively and separately displayed on at least a first display area 12-*a* and a second display area 12-*b*. In the example shown in FIG. 1, the first display area 12-*a* is an area described as a menu in the picture image plane 12 and the second display area 12-*b* is an area in which four persons are displayed in the picture image plane 12. The picture image display control circuit 13 is a control circuit designed to control to display a picture or video image on the picture image plane 12 based on a menu picture image or video signal, a selected picture image or video signal and a determined picture image or video image signal.

A picture image storage device 14 is a storage device for storing a plurality of television programs in a compressed state, which includes, for example, a hard disk using a plurality of magnetic disks as recording media or a DVD using a plurality of photoelectro-magnetic disks as recording media. In the picture image storage device 14 are stored the channel numbers of respective television programs, program start times, program finish times, the genre of programs and respective addresses corresponding to a plurality of picture images or video images which are previously selected so as to be fed in a sequence of frames successively. Besides, a plurality kinds of templates previously formed for a menu to be displayed on the first display area 12-*a* are also stored in the picture image storage device 14.

A remote controller 15 is a remote controller unit employed when an operator displays the menu on the first display area 12-*a,* selects a desired item from the menu or displays a television program corresponding to a picture image or a video image displayed on the second display area 12-*b* on the entire part of the picture image plane 12. An infrared ray receiving part 16 is a receipt converting circuit for receiving a remote control code transmitted from the remote controller 15 and selected by the operator in the form of an infrared ray signal, converting it into an electric signal and sending the electric signal.

An instruction receiving part 17 is a control circuit for receiving a remote control code (referred to as a menu display code, hereinafter) to display the menu on the first display area 12-*a,* or a remote control code (referred to as a display determining code, hereinafter) to display a television program, whose picture image is recorded, corresponding to a picture image displayed on the second display area 12-*b* on all the picture image plane 12, from the remote control codes transmitted from the infrared ray receiving part 16 and transmitting a control signal respectively corresponding to the received code to a menu display part 18 or a display determining part 23.

A selection receiving part 20 is a control circuit which receives a remote control code (referred to as a selecting code, hereinafter) corresponding to an item selected by the operator from the menu displayed on the first display area 12-*a* from the remote control codes transmitted from the infrared ray receiving part 16, transmits a control signal corresponding to the received code to the menu display part 18, further receives the respective addresses of a plurality of picture images or video images for being fed successively in a sequence of frames sent from the menu display part 18 based on the transmitted control signal and sends the respectively received addresses to a selected picture image display part 21.

The menu display part 18 mainly transmits a control signal for generating a menu to a menu generating part 19 in accordance with a control signal corresponding to a menu display code which is transmitted from the instruction receiving part 17 and sends a menu formed by the menu generating part 19 to the picture image display control circuit 13 as a menu picture image or video signal. Otherwise, the menu display part 18 is a control circuit which reflects the state of a selection carried out by the operator relative to the menu displayed on the first display area 12-*a* on the menu in accordance with a control signal corresponding to a selecting code sent from the selection receiving part 20 and transmits the reflected menu to the picture image display control circuit 13 as the menu picture image or video signal.

The menu generating part 19 is a circuit which serves to generate a menu in accordance with a control signal for generating a menu transmitted from the menu display part 18 by using the channel numbers of a plurality of television programs, the genre of programs, program start times and program finish times stored in the picture image storage device 14 and transmit the formed menu to the menu display part 18.

The selected picture image display part 21 is a control circuit which serves to read a plurality of picture image data fed successively in a sequence of frames through a picture image expanding part 22 from the picture image storage device 14 by employing the respective addresses corresponding to a plurality of picture images or video images fed successively in a sequence of frames sent from the selection receiving part 20 and sequentially transmit the read picture image data to the picture image display control circuit 13 as the selected picture image or video signal.

The display determining part 23 is a control circuit which serves to read the start address of a television program corresponding to a picture image or video image displayed on the second display area 12-b from the menu display part 18 in accordance with the control signal equivalent to the display determining code transmitted from the instruction receiving part 17, sequentially read the picture images or video images of the television program through the picture image expanding part 22 from the picture image storage device 14 based on the read start address and transmit them as determined picture image or video signals to the picture image display control circuit 13.

The picture image expanding part 22 is a picture image expanding circuit which serves to read the picture image data of addresses sent from the selected picture image display part 21 or the display determining part 23 from the picture image storage device 14, expand the compressed picture image data and send the data to the selected picture image display part 21 or the display determining part 23.

Next, the operation of an embodiment of the present invention will be described.

(1) Menu Display Operation

Initially, an operation in case where the menu is displayed on the first display area 12-a will be described. While an operator directs the transmitting part (its illustration is omitted) of the remote controller 15 to the display device 11 with the infrared ray receiving part 16 attached to a part in the vicinity thereof, he or she pushes a menu display key (its illustration is omitted) for displaying the menu on the first display area 12-a. When the menu display key is pushed, the remote controller 15 transmits a menu display code corresponding to the key to the infrared ray receiving part 16. The infrared ray receiving part 16 receives the menu display code transmitted from the remote controller 15 in the form of an infrared ray signal, converts the infrared ray signal into an electric signal and transmits the electric signal.

The instruction receiving part 17 receives the menu display code transmitted from the infrared ray receiving part 16 and sends a control signal for displaying a menu to the menu display part 18. The menu display part 18 transmits a menu generating control signal for generating a menu to the menu generating part 19 in accordance with the control signal for displaying the menu transmitted from the instruction receiving part 17.

The menu generating part 19 generates a menu by employing the channel numbers of a plurality of television programs, the genre of programs, program start times and program finish times stored in the picture image storage device 14 depending on a control signal for generating a menu transmitted from the menu display part 18.

Examples of a procedure for generating the menu will be enumerated hereinbelow.

Selection of Template

The menu generating part 19 retrieves, in order to determine spaces on the horizontal line of the menu, the oldest program start time and the newest program finish time in that day among a plurality of television programs stored in the picture image storage device 14. Further, the menu generating part 19 extracts the number of kinds (namely, the number of channels) concerning the channel numbers of a plurality of television programs included in the range of the retrieved times. Then, the menu generating part 19 takes out the most suitable template from the picture image storage device 14 based on the extracted result.

Constitution of Menu of Templates

The menu generating part 19 assigns the channel numbers of the television programs located within the retrieved times by selecting the above described template to vertical sections in a two-dimensional array represented by rows and columns on the template taken out, in accordance with an ascending order, successively from an upper part without duplicating them. Further, the menu generating part 19 allocates orderly, from the upper part of the respective channel numbers assigned to the vertical sections, that is, from the television program whose start time is the earliest, button keys indicated by icons in the side parts of the channel numbers to relevant positions. In connection with the above description, each button key indicated by the icon has a width proportional to the recording time of the television program to which the button key corresponds. The menu formed in such a manner is illustrated in FIG. 2.

The menu generating part 19 transmits the menu formed in accordance with the control signal for forming the menu transmitted from the menu display part 18 to the menu display part 18. The menu display part 18 receives the menu transmitted from the menu generating part 19 and transmits the picture image or video image of the received menu to the picture image display control circuit 13 as a menu picture or video image. When the picture image display control circuit 13 receives the menu picture or video image sent from the menu display part 18, the picture image display control circuit 13 divides the area of the picture image plane 12 into the first display area 12-a and the second display area 12-b and displays the menu on the first display area 12-a by using the received menu picture or video image signal.

Figure 2:
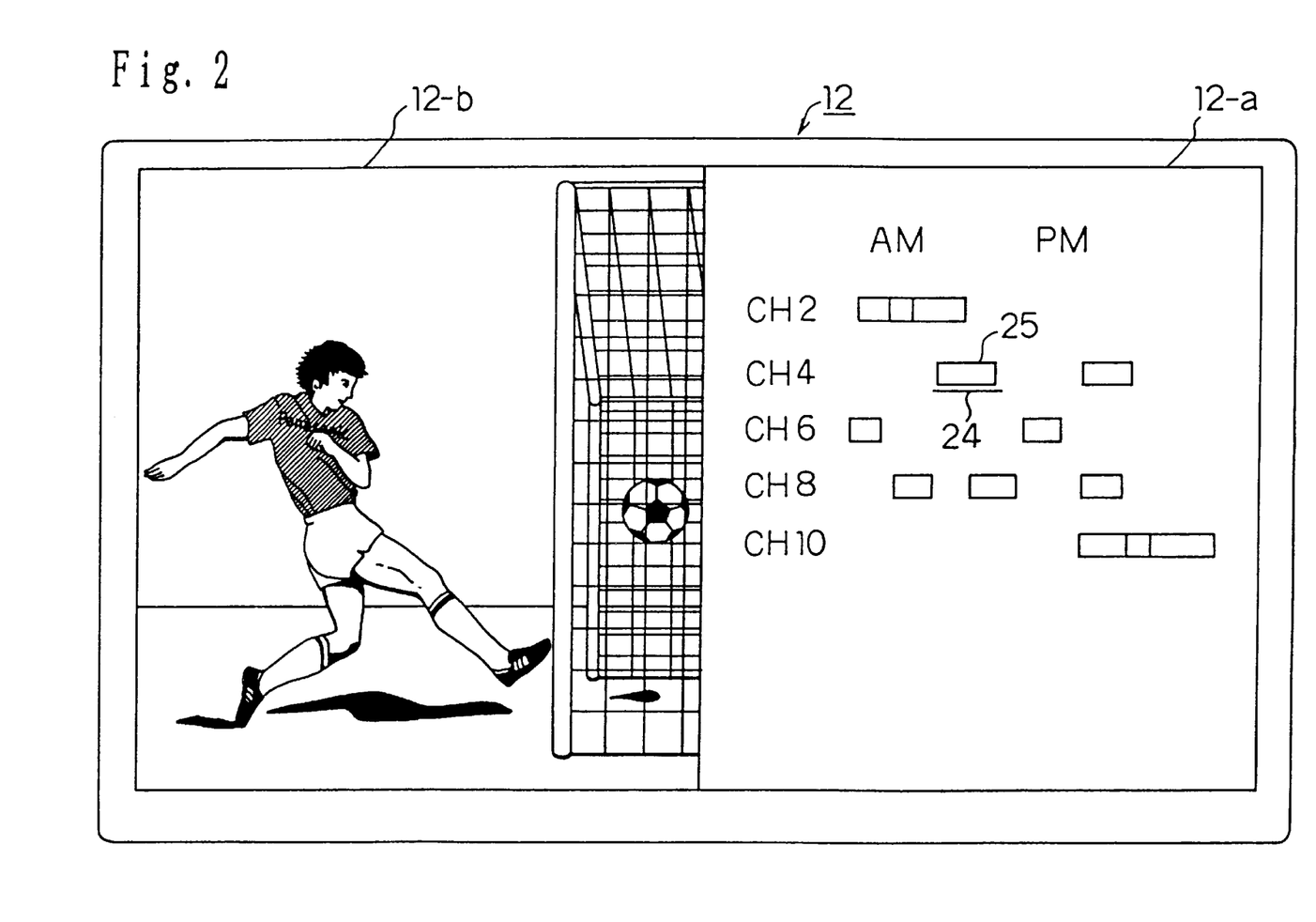
FIG. 2 is a view showing an example of a menu displayed on a first display area 12-*a* and a picture or video image displayed on a second display area 12-*b*.

As illustrated in FIG. 2, a cursor 24 indicating that a button key 25 is selected is displayed below the prescribed button key 25 on the menu displayed on the first display area 12-a. Therefore, the menu display part 18 receives from the menu generating part 19 the respective coordinate positions of a plurality of button keys on the menu, the picture image information of the cursor 24, the coordinate position of the cursor 24, and the start addresses of the television programs stored in the picture image storage device 14 assigned to each of the button keys and respective addresses corresponding to a plurality of picture images or video images fed successively in a sequence of frames which are previously selected for the television programs, and stores them.

The menu display part 18 sends the respective addresses corresponding to a plurality of picture images or video images fed successively in a sequence of frames assigned to the button key 25 indicated by the cursor 24 with an initial value on the menu to the selection receiving part 20. The selection receiving part 20 sends the respective addresses corresponding to a plurality of picture images or video images fed successively in a sequence of frames to the selected picture image display part 21. The selected picture image display part 21 sequentially reads the picture image data of the respective addresses corresponding to a plurality of picture images or video images fed successively in a sequence of frames through the picture image expanding part 22 from the picture image storage device 14. Then, the selected picture image display part 21 transmits the respective picture image data sequentially read from the picture image storage device 14 as selected picture image or video image signals at prescribed intervals to the picture image display control circuit 13. The picture image display control circuit 13 displays a plurality of picture or video images fed successively in a sequence of frames which correspond to the button key 25 indicated by the cursor 24 on the menu on the second display area 12-b, using the selected picture image or video image signals transmitted from the selected picture image display part 21. A series of operations in this paragraph will be respectively described in more detail hereinbelow.

(2) Operation Depending on Selection by Operator

An operation carried out in accordance with the selection by an operator relative to the menu displayed on the first display area 12-a will be described below. As illustrated in FIG. 2, the cursor 24 indicating that the button key 25 is selected is displayed below the button key 25 on the menu displayed on the first display area 12-a. The operator, in order to move the cursor 24, presses any one of upper, lower, right and left arrow keys (their illustrations are omitted) while he or she directs the transmitting part of the remote controller 15 to the display device 11. The operator searches a television program which he or she wants to watch among a plurality of television programs stored in the picture image storage device 14 by operating the arrow keys.

The remote controller 15, any one of the upper, lower, right and left arrow keys is pressed, transmits a selecting code corresponding to the arrow key to the infrared ray receiving part 16. The infrared ray receiving part 16 receives the selecting code transmitted from the remote controller 15 in the form of an infrared ray signal, converts the infrared ray signal into an electric signal and transmits the electric signal. The selection receiving part 20 receives the selecting code transmitted from the infrared ray receiving part 16 and transmits a control signal corresponding to the code to the menu display part 18.

The menu display part 18 changes the coordinate position of the cursor 24 on the menu in accordance with the control signal corresponding to the selecting code transmitted from the selection receiving part 20, and moves the cursor 24 on the menu to a position corresponding to the changed coordinate position by using the picture image information of the cursor 24. In such a way, the menu display part 18 reflects the state of the selection of the operator performed relative to the menu displayed on the first display area 12-a on the menu and transmits the picture or video image of the menu after the cursor 24 is changed to the picture image display control circuit 13 as a menu picture or video image signal. The picture image display control circuit 13 displays the menu on which the state of the selection by the operator is reflected on the first display area 12-a by using the menu picture or video image signal.

The menu display part 18 transmits, as described above, the respective addresses corresponding to a plurality of picture or video images fed successively in a sequence of frames which are assigned to the button key 25 corresponding to the changed cursor 24 in accordance with the selection of the operator to the selection receiving part 20. The selection receiving part 20 sends the respective addresses corresponding to a plurality of picture or video images fed successively in a sequence of frames to the selected picture image display part 21.

The selected picture image display part 21 sends in order the respective addresses corresponding to a plurality of picture or video images fed successively in a sequence of frames to the picture image expanding part 22. The picture image expanding part 22 reads out the picture image data of the respective addresses sent from the selected picture image display part 21 from the picture image storage device 14. Since the read picture image data is compressed, the picture image expanding part 22 expands the compressed picture image data and sends the expanded picture image data to the selected picture image display part 21. The selected picture image display part 21 sequentially transmits the expanded picture image data transmitted from the picture image expanding part 22 to the picture image display control circuit 13 at prescribed intervals as the selected picture image or video signal. The picture image display control circuit 13 displays a plurality of picture or video images fed successively in a sequence of frames which correspond to the button key 25 which the operator selects by changing the position of the cursor 24 on the second display area 12-b, using the selected picture or video image signal transmitted from the selected picture image display part 21.

The above described operation is carried out every time any one of the upper, lower, right and left arrow keys on the remote controller 15 by the operator is pressed and the cursor 24 moves the button key 25 on the menu.

(3) Operation for Determining Selection

An operation when the operator finds a desired television program, whose picture images are recorded by operating the upper, lower, right or left arrow key, as mentioned above, and displays the television program on the entire part of the picture image plane 12, will be described below. When the operator tries to display the television program corresponding to the picture or video images fed successively in a sequence of frames which are displayed on the second display area 12-b, on the entire part of the picture image plane 12 and watch the television program, the determining key (its illustration is omitted) of the remote controller 15 is pressed.

The remote controller 15, when the determining key is pressed, transmits a display determining code corresponding to the key to the infrared ray receiving part 16. The infrared ray receiving part 16 receives the display determining code transmitted from the remote controller 15 in the form of the infrared ray signal, converts the infrared ray signal into the electric signal and transmits the electric signal. The instruction receiving part 17 receives the display determining code transmitted from the infrared ray receiving part 16 and transmits a control signal corresponding to the code to the display determining part 23.

When the display determining part 23 receives the control signal corresponding to the display determining code from the instruction receiving part 17, the display determining part 23 reads the start address of a television program assigned to the button key 25 pointed by the cursor 24 which is stored in the menu display part 18. Then, the display determining part 23 sequentially reads the respective picture image data of television programs after the start address from the picture image storage device 14 through the picture image expanding part 22 and transmits them as determined picture image or video signals to the picture image display control circuit 13. When the picture image display control circuit 13 receives the determined picture image or video signals, it displays the reproduced picture or video images of the determined television program on the entire part of the picture image plane 12 by employing the determined picture image or video signals.

Next, a picture image selecting and display device of another embodiment according to the present invention will be described below.

Figure 3:
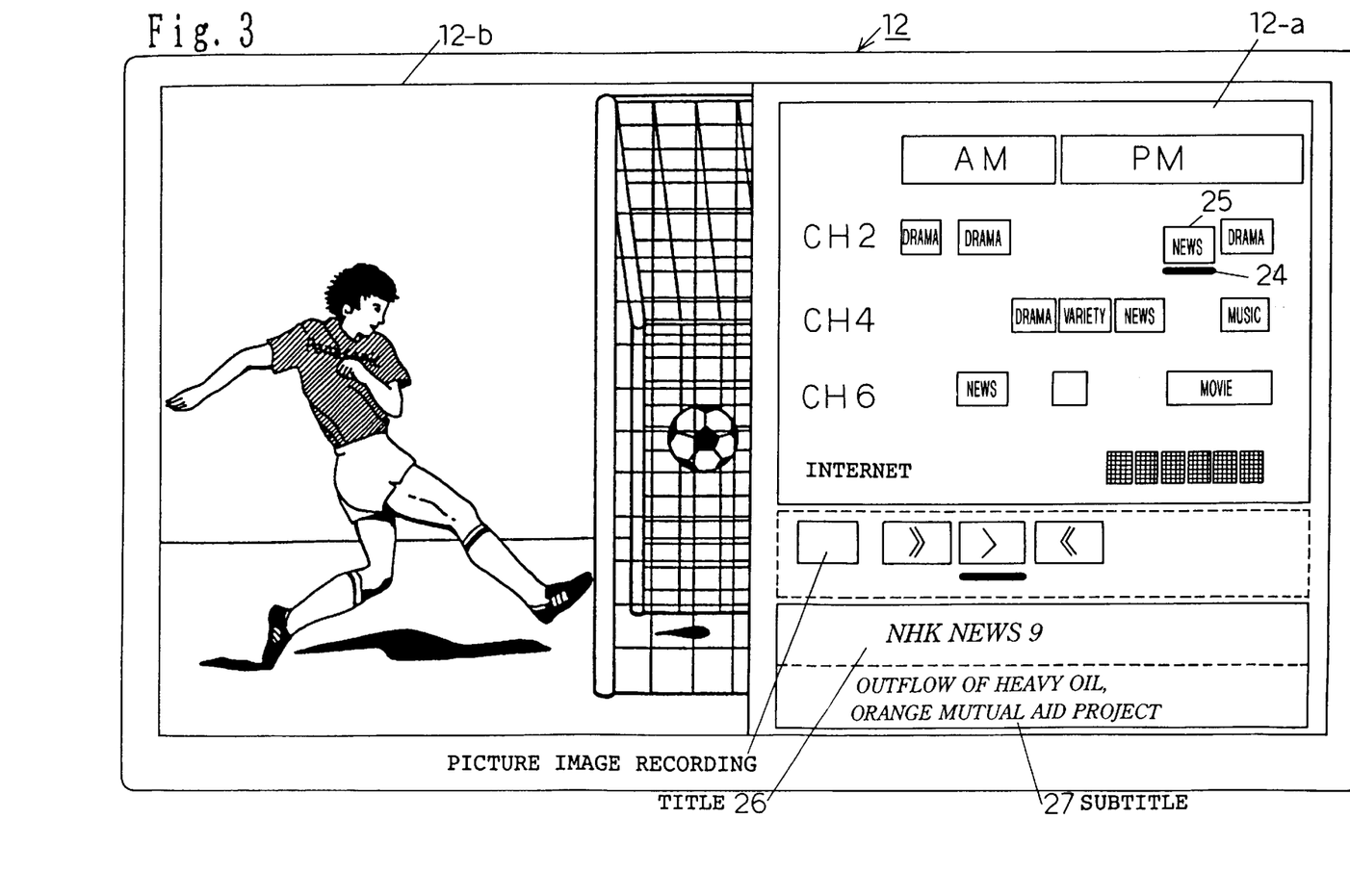
FIG. 3 is a view showing an example of a display picture image plane in a picture image selecting and dislay device of another embodiment according to the present invention.

This embodiment is different from the above described embodiment in view of the following points. Specifically, the display picture or video image of the button key selected by an operator, that is, indicated by the cursor is enlarged and displayed in the prescribed area of the first display area, in the lower side, herein, and an enlarging and display means is provided for displaying information associated with the item. Other basic construction of this embodiment is similar to that of the above mentioned embodiment shown in FIG. 1. In FIG. 3, a display picture image plane of this embodiment is illustrated. The above described enlarging and display means is not illustrated, however, may be provided, for example, in the menu generating part 19 or the menu display part 18 shown in FIG. 1, or may be provided as another means on the way to them. In addition, as associated information to be enlarged and displayed, it is stored in a picture image storage device or the like every picture image (program) by using a short sentence or the like by which the contents of the picture image corresponding to a selected button key can be understood.

Referring to FIG. 3, information corresponding to a button key 25 indicated by a cursor 24 is displayed in a title 26 and a subtitle 27 in the lower area of a first display area 12-*a*. When an operator moves the cursor 24 by means of a remote controller, information corresponding to the button key 25 pointed by the cursor 24 at a position where it is moved is newly displayed on the title 26 and the subtitle 27. With such a construction, even when the operator cannot recognize what is the selected program from a remote position, because characters displayed on the button key 25 are small, the genre, the contents of the selected program or the like can be recognized. Thus, the information of the title 26 and the subtitle 27 is previously stored in the picture image storage device 14 every program.

Figure 4:
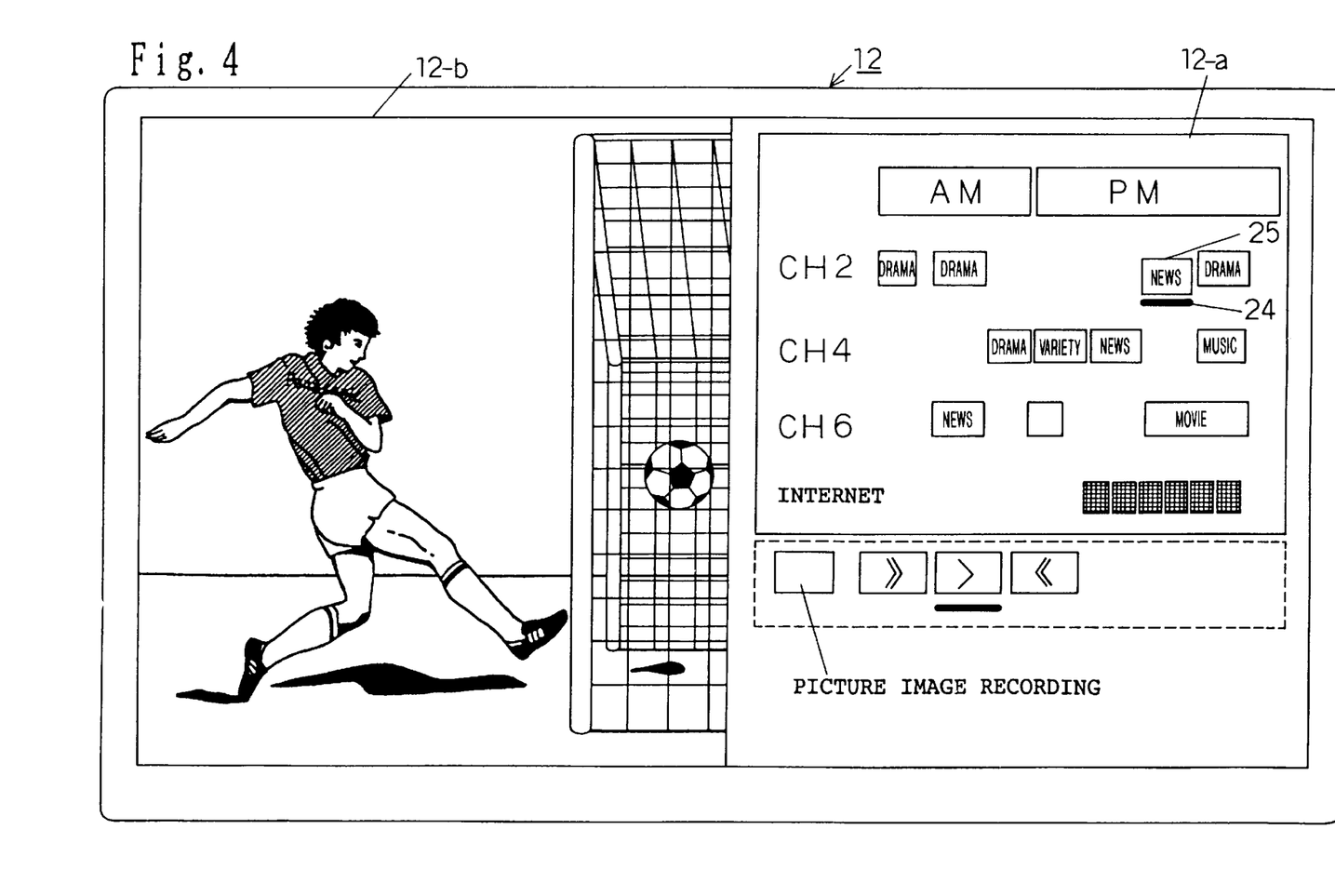
FIG. 4 is a view illustrating an example of a display image plane in a different state from that of FIG. 3.

Further, as illustrated in FIG. 4, a construction in which the above mentioned enlarged display is canceled by an operation through a remote controller can be also realized. In other words, the remote controller may be provided with a selecting button for selecting whether the enlarged display is carried out or not and the selecting button may be operated so that whether the enlarged display is carried out or not is controlled.

Additionally, it is to be noted that an enlarged and displayed area is not limited to an area below the first display area 12-*a* and another area may be employed.

Generally, when accumulated information is displayed on a menu picture image plane as much as possible, the contents of the accumulated information can be readily grasped. However, the television is enjoyed by a watcher separated by about 2 to 3 m from the television by operating the remote controller or the like, so that it is difficult to him or her to see the characters displayed on the menu picture image plane. Accordingly, as in the present embodiment, a selected item or the associated information is displayed by large characters, so that they can be recognized even with a distance operating the remote controller.

Parenthetically, although in the above mentioned embodiment, each of selecting branches displayed on the menu serves as the button key 25 displayed with the icon, it is to be understood that its shape is not limited to that illustrated in FIG. 2 and it may be represented in other pattern. Further, it is to be noted that each of the respective selecting branches displayed on the menu may be constituted of a text such as a numeric character.

Further, although in the above mentioned embodiment, the picture or video images displayed on the second display area 12-*b* are those fed successively in a sequence of frames, it is to be understood that they may be formed with at least one stationary picture image previously arbitrarily designated, a top picture image plane, or a television program itself whose picture images are recorded.

Still further, although, in the above mentioned embodiment, when any one of the upper, lower, right and left arrow keys is selected, the picture images or video images fed successively in a sequence of frames which are assigned to the button key 25 determined by the selection are immediately displayed on the second display area 12-*b*, it will be noted that a selecting key (its illustration is omitted) may be further provided on the remote controller 15 and the picture images or video images fed successively in a sequence of frames may be displayed on the display area only when the selecting key is pressed.

Still further, although, in the above described embodiment, the selected button key 25 is indicated by using the cursor 24, the selection of the button key 25 may be exhibited by deforming the figure of the button key as if the button key 25 were pushed or changing the display color of the button key 25.

In addition, although, in the above mentioned embodiment, the first display area 12-*a* is one area of the two areas obtained by dividing the picture image plane 12, the first display area 12-*a* may have a plurality of areas obtained by further dividing the picture image plane 12.

Still further, although, the picture image storage device 14 stores the data of the television programs for one day and the templates for the television programs for one day are employed, it is to be recognized that the picture image storage device 14 may store the data of the television programs of several days, several weeks or a series of specific days of the week or the like and the templates corresponding to any of them may be employed. In this case, up and down keys for the pages of a menu may be further provided on the remote controller 15 so as to meet the menu including a plurality of pages. Additionally, it will be noted that data to be stored in the picture image storage device 14 may not be limited to the picture images of the television programs and may include the picture images of an encyclopedia, a medical science book or a catalogue of goods or the like.

Still further, although, in the above described embodiment, the picture images stored in the picture image storage device are employed, it is to be noted that data received from a picture image data transmitting system or the like using a usual television broadcasting, a CATV or a telecommunication line may be used in place thereof and displayed in real time. In this case, future programs cannot be displayed, however, the picture image storage device can be saved and a search between channels can be rapidly carried out. In addition, if the image storage device is provided, the past programs can be accumulated and displayed.

Besides, the present invention may concern a picture image display device comprising a display means such as a cathode ray tube having a display area, a menu display means for displaying a menu stored in a picture image storing means such as a hard disk or including a plurality of selecting branches corresponding to a plurality of picture images which are transmitted, in the display area, and an enlarging and display means for enlarging and displaying information included in the menu displayed in the display area in a prescribed area of the display area.

Furthermore, although, in the above mentioned embodiment, the respective parts of the components of the picture image selecting and display device are constructed in terms of hardware based on the block diagram illustrated in FIG. 1, it will be understood that they are not necessarily limited to the above description, but some of the components of the picture image selecting and display device according to the present invention may be constituted of a program for executing processes concerning the operations described in the above mentioned embodiment and a computer in which the program is started in terms of software.

Industrial Applicability

As apparent from the above explanation, according to the present invention, the picture image selecting and display device with a simple structure can be realized at low cost and a desired picture image can be selected among a plurality of picture images stored in the picture image storing means by a simple operation without unnecessary repeated operations.

Further, according to the present invention, the menu is not constructed on the basis of a text, the selecting branches extended to a two-dimensional array or arrangement every channel considering a time base are employed in place of the ten key of a conventional remote controller so that the desired picture image can be selected by an operation easily understood empirically and visually without reading characters by an operator and it can be displayed on the second display area.

Still further, according to the present invention, even when the operator selects any one of a plurality of selecting branches included in the menu displayed on the first display area and a picture or video image displayed on the second display area is not the image which is not desired by the operator, the operator can select another selecting branch subsequently to the selection and display another program on the second display area. Thus, the present invention can exhibit an effect without requiring forced excessive repeated operations. Besides, according to the present invention, even when the menu covers a plurality of pages, since the menu is displayed on the first display area until the selection is determined, the operator can continuously and repeatedly carry out an operations for selecting a picture image without unnecessary repeated operations, while changing the pages of the menu, until a desired picture image is found.

Furthermore, according to the present invention, the item of the selecting branch selected on the menu is enlarged and displayed, the contents of the item can be recognized.

What is claimed is:

1. In an image selection and display device, including a disk storage facility, a first display area for displaying a menu and a second display area for displaying an image, a method for displaying the menu and the image comprising the steps of:

(a) recording for storage in the disk storage facility a plurality of television programs over a predetermined span of time;

(b) recording for storage in the disk storage facility channel numbers, program start times, program finish times and program genre corresponding to respective programs in the plurality of television programs;

(c) determining a number for the different channel numbers stored in the disk storage facility;

(d) determining the oldest program start time and the newest program finish time stored in the disk storage facility;

(e) selecting a template from a plurality of templates of different sizes for the menu based on steps (c) and (d) and based on fitting the menu to a size of the first display area so that there is a vertical section for each stored channel number and a horizontal section for time spanning from the earliest stored program to the latest stored program;

(f) displaying the menu on the first display area after performing steps (a) through (e); and (g) selecting a television program from the displayed menu for display on the second display area.

2. The method of claim 1 wherein step (e) includes allocating a width in a vertical section proportional to the recording time of the television program.

* * * * *

UNITED STATES PATENT AND TRADEMARK OFFICE
CERTIFICATE OF CORRECTION

PATENT NO. : 6,351,599 B1
DATED : February 26, 2002
INVENTOR(S) : Junichi Komeno It is certified that error appears in the above-identified patent and that said Letters Patent is hereby corrected as shown below:

<u>Title page,</u>
Item [56], References Cited, U.S. PATENT DOCUMENTS, please insert:
-- 5,819,103    10/1998        Endoh et al.
   5,481,296    1/1996         Cragun et al. --

FOREIGN PATENT DOCUMENTS, please insert:
-- 7-168855     7/1995      Japan
   7-182366     7/1995      Japan
   WO 9608927   3/1996      PCT
   624039       11/1994     EPO
   687109       12/1995     EPO
   355697 A2    2/1990      EPO
   656727       6/1995      EPO
   WO 9501058   1/1995      PCT --

OTHER DOCUMENTS, please insert:
-- Japanese Office Action dated August 31, 1999. Supplementary European
   Search Report dated October 5, 1999, Appln. No. EP 97905418 --

Signed and Sealed this

Twenty-ninth Day of April, 2003

JAMES E. ROGAN
*Director of the United States Patent and Trademark Office*